United States Patent
Delayen et al.

(10) Patent No.: US 10,922,715 B2
(45) Date of Patent: Feb. 16, 2021

(54) DYNAMICALLY MODIFYING ACTIVATION BEHAVIOR OF A COMPUTERIZED GRAPHICAL ADVERTISEMENT DISPLAY

(71) Applicant: Criteo SA, Paris (FR)

(72) Inventors: Thomas Delayen, Paris (FR); Benoit Jehanno, Paris (FR); Marc Dousset, Paris (FR)

(73) Assignee: Criteo SA, Paris (FR)

( * ) Notice: Subject to any disclaimer, the term of this patent is extended or adjusted under 35 U.S.C. 154(b) by 168 days.

(21) Appl. No.: 16/396,537

(22) Filed: Apr. 26, 2019

(65) Prior Publication Data

US 2020/0342494 A1    Oct. 29, 2020

(51) Int. Cl.
*G06Q 30/00*   (2012.01)
*G06Q 30/02*   (2012.01)
*G06F 8/35*    (2018.01)

(52) U.S. Cl.
CPC .......... *G06Q 30/0248* (2013.01); *G06F 8/35* (2013.01); *G06Q 30/0277* (2013.01)

(58) Field of Classification Search
None
See application file for complete search history.

(56) References Cited

U.S. PATENT DOCUMENTS 9,633,364 B2 * 4/2017 Martini .............. G06Q 30/0241
9,691,086 B1 * 6/2017 Deodhar ............ G06Q 30/0277
9,787,698 B2 * 10/2017 Davis .................... G06F 21/554
10,580,046 B2 * 3/2020 Gangloff ............ G06Q 30/0277
10,817,911 B2 * 10/2020 Delayen ............. G06Q 30/0276
2006/0156283 A1 * 7/2006 Landau .............. G06Q 30/0277
717/114

(Continued)

FOREIGN PATENT DOCUMENTS

WO    WO-2008030670 A1 *  3/2008  ............. G06Q 30/02

OTHER PUBLICATIONS

CAPTCHA, Feb. 20, 2011, http://en.wikipedia.org/wiki/CAPTCHA, (Year: 2011).*

(Continued)

*Primary Examiner* — Michael Bekerman
(74) *Attorney, Agent, or Firm* — Proskauer Rose LLP

(57) ABSTRACT

A server computing device receives a request for graphical display source code for a computerized graphical advertisement display. The server generates the source code comprising a plurality of activation behaviors for the display, where upon generation the display is associated with a default activation behavior. A client computing device and captures a user interaction event for the display, the user interaction event associated with a user. The client determines whether the user intended to activate the display via the captured event, based upon characteristics of the user interaction event, characteristics of the computerized graphical advertisement display, characteristics of the client computing device, and an interaction history with other graphical advertisement displays. The client selects an activation behavior in the source code based upon the determination. The client changes the default activation behavior for the display to the selected activation behavior and executes the selected activation behavior.

46 Claims, 8 Drawing Sheets

(56) References Cited

U.S. PATENT DOCUMENTS

| | | | | |
|---|---|---|---|---|
| 2008/0281708 A1* | 11/2008 | Deal | ............... | G06Q 30/0269 705/14.53 |
| 2010/0131353 A1* | 5/2010 | Ha | ............... | G06Q 30/0277 705/14.42 |
| 2011/0029386 A1* | 2/2011 | Devries | ............ | G06Q 30/0267 705/14.64 |
| 2014/0358678 A1* | 12/2014 | Raab | ............... | G06Q 30/0248 705/14.47 |
| 2016/0162939 A1* | 6/2016 | Kang | ............... | G06Q 30/0255 705/14.53 |
| 2017/0287012 A1* | 10/2017 | Le Barz | ............ | G06Q 30/0269 |

OTHER PUBLICATIONS

Privad: Rearchitecting Online Advertising for Privacy, Technical Report: MPI-SWS-2009-004, Guha et al., Max Planck Institute for Software Systems, Oct. 2, 2009, pp. 1-30. (Year: 2009).*

Serving Ads from localhost for Performance, Privacy, and Profit, Guha et al., accessed on Feb. 22, 2011, http://adresearch.rnpi-sws.org/privad-workshop.pdf (Year: 2011).*

* cited by examiner

DYNAMICALLY MODIFYING ACTIVATION BEHAVIOR OF A COMPUTERIZED GRAPHICAL ADVERTISEMENT DISPLAY

TECHNICAL FIELD

The present technology relates to the generation of graphical display source code for a computerized graphical advertisement display, and, more particularly, to dynamically modifying an activation behavior of a computerized graphical advertisement display.

BACKGROUND

Publisher systems can provide webpages or other online content that can include one or more advertisement display opportunities for computerized graphical advertisement displays (e.g., space for a banner advertisement across the top of the webpage, within an application, or within other media such as videos or images). In some instances, when a user device (e.g., a computer running a web browser) processes a webpage for display, the user device can request, from an ad system, graphical display source code for a computerized graphical advertisement display for one of the advertisement display opportunities. The ad system can provide the graphical display source code to the user device to render and/or display.

Often, a user at the user device can engage with the rendered advertisement display by activating the display via a user interaction event, such as a mouse click on the display, a tap or swipe on the display, and the like. The rendered advertisement display can execute an activation behavior in response to the user interaction event. In one such example, the source code comprising the rendered advertisement display can instruct a browser window to open on the user device and redirect the browser to, e.g., an advertiser's website. Generally, advertisement display source code is configured with a default activation behavior during generation and/or loading into a webpage or native application on the user device. Traditionally, the activation of an advertisement display is associated with a cost or value (e.g., CPI, CPC) that is incurred by the advertiser and provided to the publisher as compensation for rendering of the advertisement.

However, in some instances a user may inadvertently activate an advertisement display, even though the user is not interested in the display or did not intend to activate the display. For example, a user may mis-click on an advertisement display when a webpage is loading, or a user may mis-tap an advertisement display on a touch-enabled device when the user intended to pinch or zoom a webpage instead. If the advertisement display is configured with an activation behavior to activate by default when clicked or tapped, the source code for the graphical advertisement display will activate the advertisement display (and thus, the advertiser still incurs the cost associated with the advertisement display)—but the advertiser is not likely to realize any revenue or conversion associated with the activation because the user's interaction was inadvertent. Therefore, the advertiser incurs a higher cost for presentation of the computerized graphical advertisement display to users of remote computing device—which results in less efficient and less cost-effective advertising campaigns.

SUMMARY

Accordingly, what is needed are computerized methods and systems that dynamically change an activation behavior for a digital advertisement display on a computing device to reduce the occurrence of inadvertent user interactions, such as mis-clicks or mis-taps. The techniques described herein provide the significant technical advantage of analyzing a user's interaction history with digital advertisement displays, and in some embodiments, other similar users' interaction history with the same or similar digital advertisement displays, and automatically modifying the activation behavior of subsequent digital advertisement displays presented to the user based upon the historical analysis of the user's interactions. The technical features of the systems and methods described herein provide for dynamic, real-time change to how digital advertisement displays (e.g., in webpages, on native mobile applications) can be activated by specific user input events provided via the computing device.

In one aspect, there is a system for dynamically modifying an activation behavior of a computerized graphical advertisement display. The system comprises a server computing device with a memory for storing computer-executable instructions and a processor that executes the computer-executable instructions. The server computing device receives a request for graphical display source code for a computerized graphical advertisement display. The server computing device generates the graphical display source code for the computerized graphical advertisement display, the graphical display source code comprising a plurality of activation behaviors for the computerized graphical advertisement display, where upon generation the computerized graphical advertisement display is associated with a default activation behavior of the plurality of activation behaviors. The system comprises a client computing device with a memory for storing computer-executable instructions and a processor that executes the computer-executable instructions, that is coupled to the server computing device. The client computing device displays the computerized graphical advertisement display using the graphical display source code received from the server computing device. The client computing device captures a user interaction event for the computerized graphical advertisement display, the user interaction event associated with a user. The client computing device determines whether the user intended to activate the computerized graphical advertisement display via the captured user interaction event, based upon one or more characteristics of the user interaction event, one or more characteristics of the computerized graphical advertisement display, one or more characteristics of the computing device, and an interaction history. The client computing device selects one of the plurality of activation behaviors in the graphical display source code based upon the determination. The client computing device changes the default activation behavior for the computerized graphical advertisement display to the selected activation behavior and execute the selected activation behavior of the computerized graphical advertisement display.

In another aspect, there is a computerized method of dynamically modifying an activation behavior of a computerized graphical advertisement display. A server computing device receives a request for graphical display source code for a computerized graphical advertisement display. The server computing device generates the graphical display source code for the computerized graphical advertisement display, the graphical display source code comprising a plurality of activation behaviors for the computerized graphical advertisement display, where upon generation the computerized graphical advertisement display is associated with a default activation behavior of the plurality of activation behaviors. A client computing device, coupled to the server computing device, displays the computerized graphical advertisement display using the graphical display source code received from the server computing device. The client computing device captures a user interaction event for the computerized graphical advertisement display, the user interaction event associated with a user. The client computing device determines whether the user intended to activate the computerized graphical advertisement display via the captured user interaction event, based upon one or more characteristics of the user interaction event, one or more characteristics of the computerized graphical advertisement display, one or more characteristics of the computing device, and an interaction history. The client computing device selects one of the plurality of activation behaviors in the graphical display source code based upon the determination. The client computing device changes the default activation behavior for the computerized graphical advertisement display to the selected activation behavior and execute the selected activation behavior of the computerized graphical advertisement display.

Any of the above aspects can include one or more of the following features. In some embodiments, the client computing device executes the selected activation behavior of the computerized graphical advertisement display upon detecting a user interaction event that matches a selected activation behavior for the computerized graphical advertisement display. In some embodiments, the plurality of activation behaviors for the computerized graphical advertisement display comprise redirection to a landing page, display of a countdown window, display of a call-to-action window, display of a confirmation window, display of a CAPTCHA request, display of a swipe request, and display of a landing page preview. In some embodiments, the user interaction event comprises one or more of: a single click, a double click, a sequence of single clicks, a cursor movement, a scroll event, a single tap, a double tap, a touch, a multitouch, a sequence of taps, one or more coordinates of a single click, one or more coordinates of a double click, one or more coordinates of a single tap, one or more coordinates of a double tap, a force associated with a single tap, a force associated with a double tap, or a swipe. In some embodiments, the client computing device discards the user interaction event based upon the determination.

In some embodiments, the determination comprises a probability that the user intended to activate the computerized graphical advertisement display via the captured user interaction event, a heuristic associated with the user's intent to activate the computerized graphical advertisement display via the captured user interaction event, or a combination of the probability and the heuristic. In some embodiments, the one or more characteristics of the user interaction event comprise a duration of the user interaction event, a length of time between display of the computerized graphical advertisement display and detection of the user interaction event, a location of a cursor in the computerized graphical advertisement display that is associated with the user interaction event, a distance between a location of a cursor in the computerized graphical advertisement display at a start of the user interaction event and at an end of the user interaction event, a number of sub-events within the user interaction event, a sequence of sub-events within the user interaction event, a force applied by the user to the computing device during the user interaction event, a state of the computerized graphical advertisement display at a time of detection of the user interaction event, and one or more characteristics of the computing device at a time of detection of the user interaction event. In some embodiments, the one or more characteristics of a visual element of the computerized graphical advertisement display associated with a user interaction comprise a size of the visual element, a position of the visual element, an opacity of the visual element, a color of the visual element, a movement speed of the visual element, and a contrast of the visual element with a surrounding area of the computerized graphical advertisement display. In some embodiments, display of the computerized graphical advertisement display comprises a point of time at which the computerized graphical advertisement display is generated by the server computing device, a point of time at which the computerized graphical advertisement display is viewable on the client computing device, or a point of time at which the graphical display source code of the computerized graphical advertisement display is executed by the client computing device.

In some embodiments, the interaction history comprises one or more of user interaction events of the user with one or more other computerized graphical advertisement displays, one or more of user interaction events of other users with one or more other computerized graphical advertisement displays, and one or more advertisement characteristics of one or more other computerized graphical advertisement displays. In some embodiments, the one or more characteristics of the computerized graphical advertisement display comprise a size of the computerized graphical advertisement display, a display location of the computerized graphical advertisement display, a software application associated with display of the computerized graphical advertisement display, a framerate of a software application associated with display of the computerized graphical advertisement display, a supply side platform (SSP) associated with the computerized graphical advertisement display, a software development kit (SDK) associated with the computerized graphical advertisement display, and one or more characteristics of a visual element of the computerized graphical advertisement display associated with a user interaction. In some embodiments, the one or more characteristics of the client computing device comprise an operating system of the client computing device, a CPU speed of the client computing device, a touch support capability of the client computing device, attributes of an accelerometer embedded in the client computing device, an ambient lighting reading captured by the client computing device, a screen resolution of the client computing device, a resolution of touch events of the client computing device, a resolution of swipe events of the client computing device, and a hardware platform of the client computing device.

In some embodiments, the client computing device displays the computerized graphical advertisement display in a webpage using a browser installed on the client computing device. In some embodiments, the client computing device redirects the browser to another webpage upon executing the selected activation behavior of the computerized graphical advertisement display, wherein the selected activation behavior comprises: display of a countdown window, display of a call-to-action window, display of a confirmation window, display of a CAPTCHA request, display of a swipe request, or display of a landing page preview. In some embodiments, the client computing device displays the computerized graphical advertisement display in a native application installed on the client computing device. In some embodiments, the client computing device activates functionality of the native application upon executing the selected activation behavior of the computerized graphical advertisement display, wherein the selected activation behavior comprises: display of a countdown window, display of a call-to-action window, display of a confirmation window, display of a CAPTCHA request, display of a swipe request, or display of a landing page preview. In some embodiments, the activated functionality of the native application comprises launching a browser installed on the client computing device and redirecting the launched browser to a webpage, or launching another native application on the client computing device.

In some embodiments, determining whether the user intended to activate the computerized graphical advertisement display via the captured user interaction event comprises determining, by the server computing device, a value associated with the user interaction event and adjusting, by the client computing device, the determination based upon the determined value. In some embodiments, the client computing device uses one or more heuristic functions to adjust the determination based upon the determined value. In some embodiments, the value associated with the user interaction event comprises a publisher cost associated with the computerized graphical advertisement display, an advertiser cost associated with the computerized graphical advertisement display, and a product value associated with the computerized graphical advertisement display. In some embodiments, the client computing device adapts one or more characteristics of the computerized graphical advertisement display based upon the adjusted determination. In some embodiments, the adapted one or more characteristics of the computerized graphical advertisement display comprise a size of the computerized graphical advertisement display, a location of the computerized graphical advertisement display, a size of a visual element of the computerized graphical advertisement display, a location of a visual element of the computerized graphical advertisement display, a change to an animation of the computerized graphical advertisement display, and a presence of a visual element of the computerized graphical advertisement display. In some embodiments, the determining step is performed by the server computing device.

Other aspects and advantages of the present technology will become apparent from the following detailed description, taken in conjunction with the accompanying drawings, illustrating the principles of the technology by way of example only.

BRIEF DESCRIPTION OF THE DRAWINGS

The foregoing and other objects, features, and advantages of the present technology, as well as the technology itself, will be more fully understood from the following description of various embodiments, when read together with the accompanying drawings, in which.

DETAILED DESCRIPTION

The present technology provides systems and methods for the computerized generation of graphical display source code for computerized graphical advertisement displays. In some embodiments, the technology can provide improved computerized graphical advertisement displays by generating displays with context-specific activation behaviors that can determine whether a user interaction event with the computerized graphical advertisement display was intended or not (e.g., via historical user interaction data), and change an activation behavior of the computerized graphical advertisement display in the case of an unintended user interaction. As a result, the technology described herein advantageously reduces the occurrence of user device redirections to another website based upon unintended user interactions by changing the source code associated with the default activation behavior of a computerized graphical advertisement display relating to the website.

Although the technology is illustrated and described herein with reference to specific embodiments, the technology is not intended to be limited to the details shown. Various modifications can be made in the details within the scope the claims and without departing from the technology.

Figure 1:
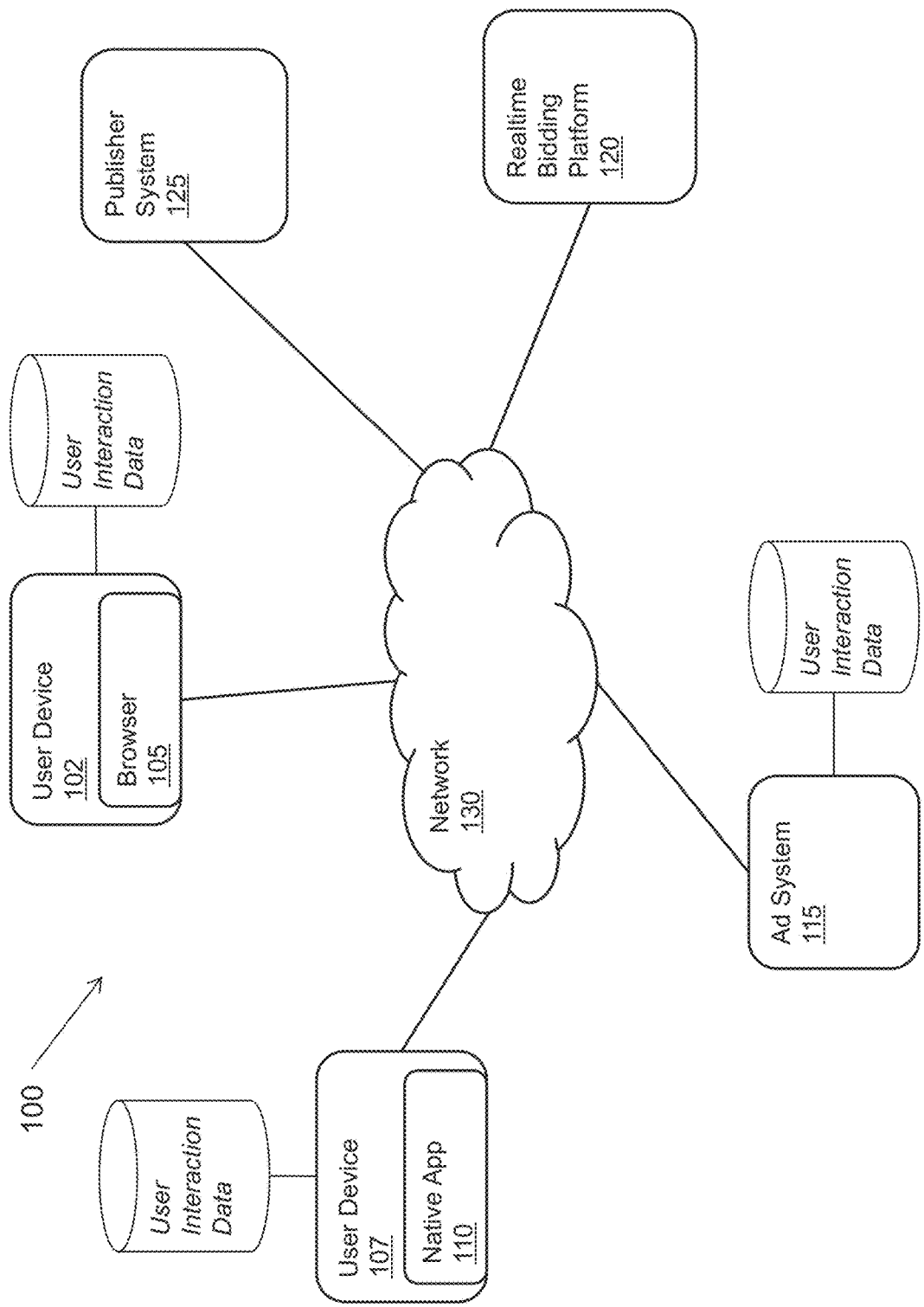
FIG. 1 is a diagram of a networked system in accordance with embodiments of the technology.

FIG. 1 is a diagram of networked system 100 in accordance with embodiments of the technology. As illustrated, networked system 100 can include user device 102, user device 107, ad system 115, realtime bidding ("RTB") platform 120, and publisher system 125. User device 102, user device 107, ad system 115, RTB platform 120, and publisher system 125 can be in data communication via network 130. User devices 102 and 107 can each be any computing devices. In some embodiments, user devices 102 and 107 can each be one of a mobile computing device (e.g., cellular phones and/or tablets), a PC, or other computing device. User device 102 executes web browser 105. User device 107 executes native application 110 (e.g., a mobile application locally installed on the device 107 that interacts with online content). In some embodiments, user devices 102 and 107 can be associated with the same user, or with different users.

One or more of user device 102, user device 107, and ad system 115 can be coupled to a database that comprises user interaction data. As will be explained herein, user interaction data comprises data associated with historical interactions between, e.g., a user of device 102 and/or 107 and one or more computerized graphical advertisement displays presented to the user on the device 102 and/or 107. For example, the historical interactions relate to the display of and/or interaction with a computerized graphical advertisement display—such as views, clicks, taps, swipes and other user interaction events where the user engages or interacts with an advertisement display. The system can utilize the user interaction data to determine whether a user interaction event with an advertisement display currently being displayed on a device 102, 107 (or, in some embodiments, being prepared for display on device 102, 107) indicates a user's intent to activate the computerized graphical advertisement display.

In some embodiments, the computerized graphical advertisement display is associated with an activation behavior or a plurality of activation behaviors, including but not limited to a default activation behavior (i.e., an activation behavior that is preconfigured in the advertisement display). Generally, an activation behavior is a behavior exhibited by the computerized graphical advertisement display (e.g., by executing functionality embedded in the advertisement display) upon receiving an interaction (such as a click or tap) from the user. Exemplary activation behaviors include, but are not limited to, redirection to a landing page, display of a countdown window, display of a call-to-action window, display of a confirmation window, display of a CAPTCHA request, display of a swipe request, and display of a landing page preview.

In some cases, as mentioned above, a user may inadvertently interact with an advertisement display (e.g., by mis-clicking or mis-tapping on the advertisement display even though the user did not intend to initiate the interaction). In these instances, the advertiser likely will not realize a sale or conversion because the user was not interested in the advertisement. As such, the advertiser may seek to limit or prevent these types of unintended interactions. In addition, certain users may be prone to such inadvertent interactions—for example, a user may frequently mis-click or mis-tap on an advertisement. Such interactions can be captured by the system (as part of the user interaction data) and the resulting data can be used to change the default activation behavior to a different activation behavior before the user interacts with the advertisement display (e.g., when the advertisement is loaded by software on the device 102, 107 and/or after display of the advertisement to the user). For example, if a user frequently initiates a single click on a location in the advertisement display (e.g., the lower-left corner of the display which does not contain any products), the system can classify this interaction as a mis-click and adjust subsequent advertisement displays to utilize a different activation behavior for this user (e.g., instead of activating the advertisement display on a single click anywhere in the display, the system can, upon detecting a single click, display a call-to-action window that waits for an additional click from the user before activating the advertisement display).

Ad system 115 can be any computing device, such as a server or multiple servers. In some embodiments, ad system 115 can collect behavioral data for a plurality of devices, browsers, and/or applications. In some embodiments, ad system 115 can receive behavioral data for a plurality of devices, browsers, and/or applications from third-parties. In some embodiments, ad system 115 can provide graphical display source code for a computerized graphical advertisement display in accordance with the present technology.

RTB platform 120 can be any computing device, such as a server or multiple servers. In some embodiments, RTB platform 120 can perform auctions for advertising display opportunities in online media, such as webpages or application content served by publisher system 125, that are provided to user devices 102 and/or 107. Ad system 115 can submit bids for such advertising opportunities, and if ad system 115 wins the auction, ad system 115 can provide source code or other display data for a computerized graphical advertisement display to fill the advertising display opportunity. Publisher system 125 can be any computing device, such as a server or multiple servers. In some embodiments, publisher system 125 can serve webpages to browser 105. In some embodiments, publisher system 125 can serve other content to application 110. In some embodiments, publisher system 125 can communicate with ad system 115 to determine whether ad system 115 will provide source code for a computerized graphical advertisement display to fill an advertisement display opportunity in a webpage or application content. Network 130 can be any network or multiple networks. For example, network 140 can include cellular networks through which user devices 102 and 107 are connected and the Internet.

Figure 2:
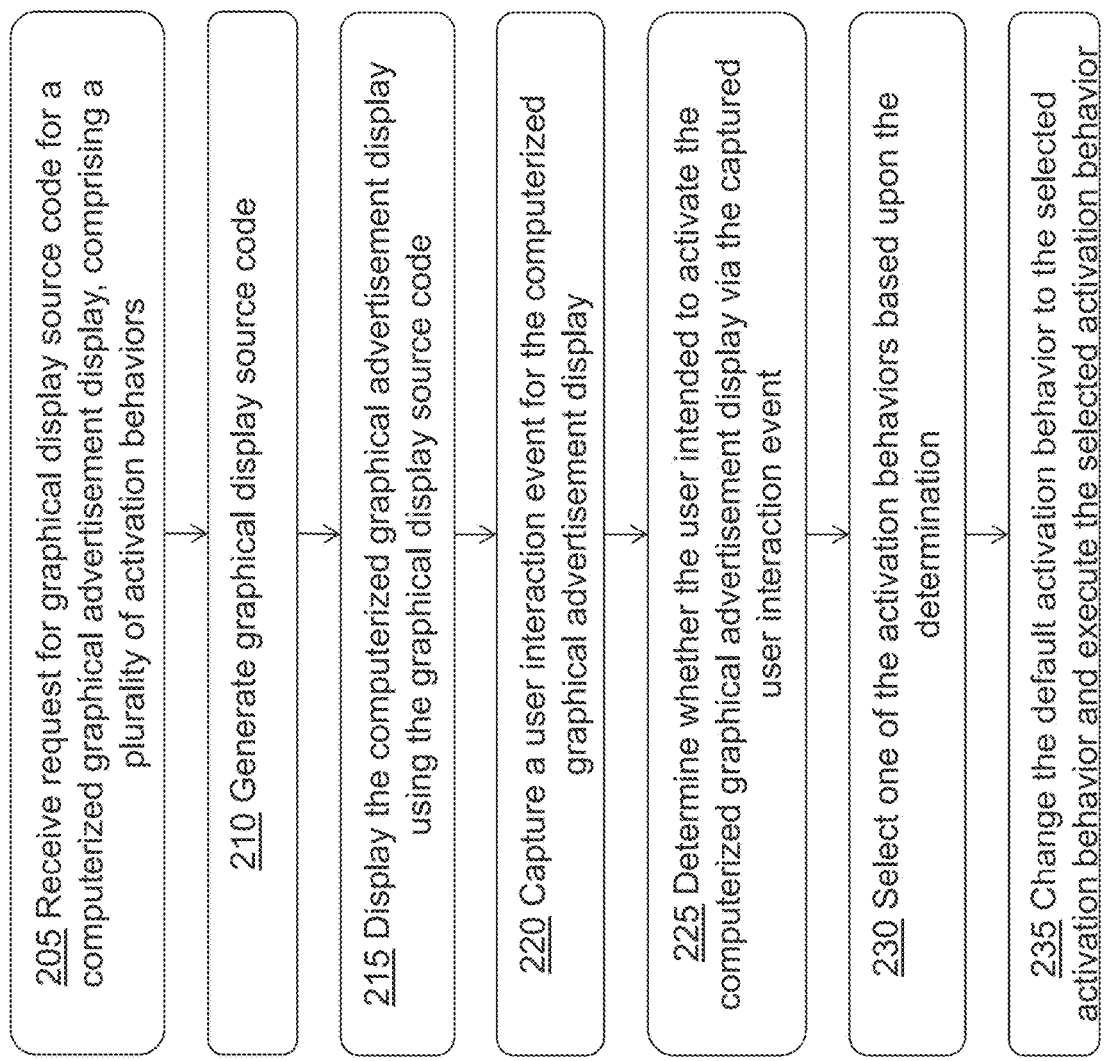
FIG. 2 is a flow chart for the generation of graphical display source code for a computerized graphical advertisement display, including the dynamic modification of an activation behavior for the advertisement display.

FIG. 2 is a flow chart of a computerized method for the generation of graphical display source code for a computerized graphical advertisement display, including the dynamic modification of an activation behavior for the advertisement display, using the system 100 of FIG. 1. At step 205, a computing device (e.g., ad system 115) receives a request for graphical display source code for a computerized graphical advertisement display. The request can be received from a browser or other application executing on a user device (e.g., browser 105 on user device 102, native application 110 on user device 107). In some embodiments, the request comprises a packet-based message transmitted from an initiating device (e.g., user device 102, 107) to a receiving device (e.g., ad system 115). In these embodiments, the request message can include data relating to the request such as timestamp, originating device ID, user ID, originating device hardware/software configuration attributes, message addressing information (e.g., IP address), browser/native app attributes, publisher information, advertising impression information, and the like. Also, it should be appreciated that, in some embodiments, the user device 102, 107 can be the computing device that receives and processes the request for graphical display source code according to the method of FIG. 2.

At step 210, the computing device generates graphical display source code for the computerized graphical advertisement display. The source code comprises a plurality of activation behaviors for the computerized graphical advertisement display. For example, as mentioned previously, an activation behavior is a behavior exhibited by the computerized graphical advertisement display (e.g., by executing functionality embedded in the advertisement display) upon receiving an interaction (such as a click or tap) from the user. Such behaviors can include, but are not limited to, redirection to a landing page, display of a countdown window, display of a call-to-action window, display of a confirmation window, display of a CAPTCHA request, display of a swipe request, and display of a landing page preview. The computing device can include programmatic instructions in the source code that are associated with the plurality of activation behaviors—such as a URL or reference function for each activation behavior that, when activated, causes the source code to perform the associated functionality and/or connect to another computing device to perform the functionality. For example, if a first activation behavior relates to display of a confirmation window, the first activation behavior in the source code can comprise a pointer that launches a pop-up window locally for display to a user. In another example, if a second activation behavior relates to display of a CAPCHA request, the second activation behavior in the source code can comprise an API function that communicates with a remote computing device to generate, display, and receive input from the user corresponding to the CAPCHA request.

The source code can comprise each of the activation behaviors, and indicate which of the plurality of activation behaviors is a default activation behavior. The default activation behavior is the activation behavior executed by the graphical display source code in its initial state, prior to the dynamic modification described herein. For example, a typical advertisement display may be activated when a user performs a single click (or single tap) on the advertisement display (e.g., in a browser window). Thus, the default activation behavior in this case is a single click.

At step 215, the computing device displays the computerized graphical advertisement display using the graphical display source code. For example, when the computing device loads and renders a webpage or native app screen containing the advertisement display, the computing device executes the graphical display source code—including configuration of the advertisement display in the context of the webpage or native app, and the associated default activation behavior for the advertisement display. The advertisement display is presented to a user of the computing device as one or more visual/audio/animation elements that the user can view on the device, and with which the user can interact to, e.g., receive additional information about products displayed in the advertisement and/or to purchase said products, among other interactions.

At step 220, during display of the advertisement on the computing device, the computing device captures a user interaction event for the computerized graphical advertisement display. As noted above, the computing device (and/or the browser/native app) captures input initiated by the user with the advertisement display—such as a click or tap. In some embodiments, the browser/native app is configured to listen for user input and capture user input as a user interaction event—including the type of interaction captured from the user. Exemplary user activation events include, but are not limited to, one or more of a single click, a double click, a sequence of single clicks, a cursor movement, a scroll event, a single tap, a double tap, a touch, a multitouch, a sequence of taps, one or more coordinates of a single click, one or more coordinates of a double click, one or more coordinates of a single tap, one or more coordinates of a double tap, a force associated with a single tap, a force associated with a double tap, or a swipe. In some embodiments, another component of the computing device (e.g., operating system software or input device) captures the user input and provides the input to the browser/native app as a user interaction event. The user interaction event is associated with a user—for example, the computing device can associate the captured event with a user ID received as part of the request described above.

At step 225, the computing device determines whether the user intended to activate the computerized graphical advertisement display via the captured user interaction event based upon one or more characteristics of the user interaction event, one or more characteristics of the computerized graphical advertisement display, one or more characteristics of the computing device, and an interaction history with one or more other computerized graphical advertisement displays. For example, the computing device can compare characteristics of the user interaction event with the current advertising display, characteristics of the current advertisement display itself, and characteristics of the computing device that displays the advertisement display with historical interaction data (including characteristics of user interaction events with prior advertising displays, characteristics of prior advertisement displays, and characteristics of the computing device that displayed the prior advertisement displays) to determine whether the user intended to activate the current display.

The characteristics of the user interaction event generally relate to timing, position, and type of the interaction event. Exemplary characteristics can include, but are not limited to, a duration of the user interaction event, a length of time between display of the computerized graphical advertisement display and detection of the user interaction event, a location of a cursor in the computerized graphical advertisement display that is associated with the user interaction event, a distance between a location of a cursor in the computerized graphical advertisement display at a start of the user interaction event and at an end of the user interaction event, a number of sub-events within the user interaction event, a sequence of sub-events within the user interaction event, a force applied by the user to the computing device during the user interaction event, a state of the computerized graphical advertisement display at a time of detection of the user interaction event, one or more characteristics of the computing device at a time of detection of the user interaction event, a supply side platform (SSP) associated with the computerized graphical advertisement display, a software development kit (SDK) associated with the computerized graphical advertisement display, and one or more characteristics of a visual element of the computerized graphical advertisement display associated with a user interaction. For example, certain characteristics can indicate that the user intended to activate the computerized graphical advertisement display—e.g., if the user clicks the advertisement within a few seconds of the display of the advertisement or the user uses a specific level of force to tap an area of the computerized graphical advertisement display that shows a product. Likewise, other characteristics can indicate that the user did not intend to activate the computerized graphical advertisement display—e.g., the time between a 'down-click' and an 'up-click' (of a user's mouse click action) goes beyond a predefined duration (suggesting the user did not intend to click), or the location of the start of a swipe occurred on the advertisement display but the end of the swipe did not occur on the advertisement display.

As described above, the characteristics of the user interaction event can relate to one or more characteristics of a visual element of the computerized graphical advertisement display associated with a user interaction. For example, an advertisement display may include a visual element that is animated to draw attention to the display (e.g., flashing text) and the user interaction event can comprise user input that is directed to the visual element—thereby indicating that the user intended to activate the display. Exemplary characteristics of visual elements include, but are not limited to, a size of the visual element, a position of the visual element, an opacity of the visual element, a color of the visual element, a movement speed of the visual element, and a contrast of the visual element with a surrounding area of the computerized graphical advertisement display. In another example, a visual element of a computerized graphical advertisement display may move very quickly around the display area—leading to frequent mis-clicks, or a visual element may be located or have a color that blends in with surrounding areas of the website, so that users often click the visual element inadvertently instead of the surrounding area of the website.

In addition, the computing device evaluates one or more characteristics of the computerized graphical advertisement display to determine whether the user intended to activate the display. For example, a larger advertisement display or a display positioned in an area of the webpage that contains other interactive elements in close proximity to the advertising display could cause users to mis-click the advertising display instead of other features on the webpage. Exemplary characteristics of the computerized graphical advertisement display include, but are not limited to, a size of the computerized graphical advertisement display, a display location of the computerized graphical advertisement display, a software application associated with display of the computerized graphical advertisement display, and a framerate of a software application associated with display of the computerized graphical advertisement display.

The computing device can also evaluate one or more characteristics of the computing device (e.g., user device 102, 107) upon which the computerized graphical advertisement display is presented. Such characteristics can include, but are not limited to, an operating system of the computing device, a CPU speed of the computing device, a touch support capability of the computing device, and a hardware platform of the computing device. For example, the user device 102 may utilize an operating system, or CPU or other hardware that inherently generates a small amount of latency or delay when rendering visual content. As such, a user may click on an area of the screen as visual content is being rendered that corresponds to a computerized graphical advertisement display—but because the visual content is not yet fully rendered, the user intended to click on another portion of the screen that does not correspond to a computerized graphical advertisement display. The computing device can account for this type of hardware or operating system limitation when determining whether a user interaction was intended.

As noted above, the computing device analyzes the current user's interaction history (and/or multiple different users' interaction histories) with other computerized graphical advertisement displays to compare the historical interactions (including the categories of characteristics described above) to determine whether the present user interaction event is intended. For example, a number of users, including the current user, may frequently mis-click on certain banner ads displayed on a webpage because the position of the banner ad changes as the page is loading, causing the banner ad to move into a location under the user's mouse cursor and the user clicks the banner ad instead of his or her intended target. Because the default activation behavior of the banner ad is a single click, the banner ad is activated, and may cause a second browser window to open to the advertiser's website—which the user quickly closes because the click was inadvertent. The computing device captures these user interaction events and stores them in the user interaction data, along with data that indicates the user did not interact with the advertiser's website (e.g., no follow-on activity after the user interaction event, such as a conversion, website view, clicks on the website, etc.). Based on the historical user interaction data in conjunction with the present user interaction event, the computing device determines that the same user's single-click interaction with a current graphical advertisement display is a mis-click.

It should be appreciated that the computing device can analyze the interaction history of other users, separate from or in conjunction with the current user's interaction history, in order to determine whether the present user interaction is intended or not. For example, the computing device may determine that other users that share one or more characteristics (e.g., demographics, purchase history, browsing history, site visits, etc.) frequently mis-click on certain graphical advertisement displays. The system can capture and store these user interaction events and then correlate them to the current user when determining that the current user's interaction is a mis-click.

In some embodiments, the computing device can determine a cost or a value associated with the computerized graphical advertisement display, and/or a cost or value associated with activation of the computerized graphical advertisement display, when determining whether a user interaction was intended. Exemplary costs or values include, but are not limited to, publisher costs, advertiser costs, and product values. For example, the computing device can determine that activation of a computerized graphical advertisement display has a particular monetary value associated with an advertiser or publisher. In another example, the computing device can determine that a product presented in the computerized graphical advertisement display has a particular cost or value (e.g., high-end automobile, low-priced clothing, etc.) Based upon these considerations, the computing device adjust its determination of whether a user interaction event was intended or not—e.g., more expensive products being advertised may be associated with fewer intended interactions, so the computing device can adjust the determination toward a mis-click classification. In some embodiments, the computing device can adapt one or more characteristics of the computerized graphical advertisement display based upon the adjusted determination—including, but not limited to, a size of the computerized graphical advertisement display, a location of the computerized graphical advertisement display, a size of a visual element of the computerized graphical advertisement display, and a location of a visual element of the computerized graphical advertisement display. For example, if the computing device determines that a user interaction event was not intended based upon an adjustment factoring in the cost of a product displayed in the corresponding computerized graphical advertisement display, the computing device can, e.g., reduce the size of a product image in the display for that product to prevent subsequent mis-clicks and so forth.

In some embodiments, the computing device can utilize probabilistic techniques when determining whether a user intended to interact with a computerized graphical advertisement display. For example, the computing device can determine a probability that the user intended to activate the computerized graphical advertisement display (e.g., based on interaction history, if the computing device had determined that a particular user intended to activate other displays 85% of the time, then the computing device can factor in the historical percentage in generating a probability that a present interaction event was or was not intended). In some embodiments, the computing device can leverage heuristic techniques when determining whether a user intended to interact with a computerized graphical advertisement display. For example, the computing device can analyze the user interaction history with other computerized graphical advertisement displays, and other users' interaction history with those computerized graphical advertisement displays, to discover patterns and sequences within a user's activity—e.g., a particular user, or particular type of user, typically mis-clicks a computerized graphical advertisement display with a particular layout or dimensions, or placement on screen. The computing device can then leverage the results of the analysis when determining whether a user interaction was intended on a current computerized graphical advertisement display that is the same as (or substantially similar to) the historical computerized graphical advertisement displays. In some embodiments, the computing device can combine the probabilistic and heuristic methodologies when making the determination of user intent.

In some embodiments, the computing device can discard the user interaction event based upon determining that, e.g., the user interaction event was unintended. For example, the computing device can determine that a user's click was in fact a mis-click (e.g., based on the factors noted above). As a result, the computing device can instruct the browser 105 or native app 110 to ignore the user interaction and instead select a different activation behavior as described herein.

At step 230, based upon the determination of whether the user interaction event exhibits that the user intended (or did not intend) to activate the computerized graphical advertisement display, the computing device selects one of the plurality of activation behaviors in the graphical display source code. For example, if the determination is that the user intended to activate the computerized graphical advertisement display, the computing device can select an activation behavior that, e.g., results in the user device 102, 107 being presented with an advertiser website. For example, the graphical display source code can redirect browser software 105 or native app 110 on the user device to a URL associated with the advertiser website. In another example, the graphical display source code can open a new browser window or native app screen on the user device that activates a communication session with the advertiser web server to present the advertiser's web site.

If, however, the computing device determines that the user did not intend to activate the computerized graphical advertisement display, the computing device can select an activation behavior that, e.g., requests an additional interaction from the user (such as confirmation that the user wishes to proceed to the advertiser website), and/or provides an intermediate presentation step (such as a preview of the advertiser website) before the computing device presents the advertiser website to the user device 102, 107.

At step 235, upon selecting an activation behavior, the computing device changes the default activation behavior for the computerized graphical advertisement display to the selected activation behavior and executes the selected activation behavior of the computerized graphical advertisement display. For example, the computing device can instruct the browser 105 or native app 110 to replace existing graphical display source code that relates to the default activation behavior with graphical display source code that relates to the selected activation behavior. In another example, the computing device can instruct the browser 105 or native app 110 to prevent execution of the graphical display source code that relates to the default activation behavior and is present on the user device, and instead execute alternative graphical display source code that relates to the selected activation behavior and is also present on the user device. It should be appreciated that other methodologies for changing the default activation behavior and executing the selected activation behavior (e.g., retrieving graphical display source code for the selected activation behavior from another website or server) can be contemplated and utilized with the technology described herein.

FIGS. 3-8 are diagrams of exemplary computerized graphical advertisement displays that show how the default activation behavior is changed to a selected activation behavior—which is then executed to result in a different behavior of the computerized graphical advertisement display (e.g., in the event of a user mis-click).

Figure 3:
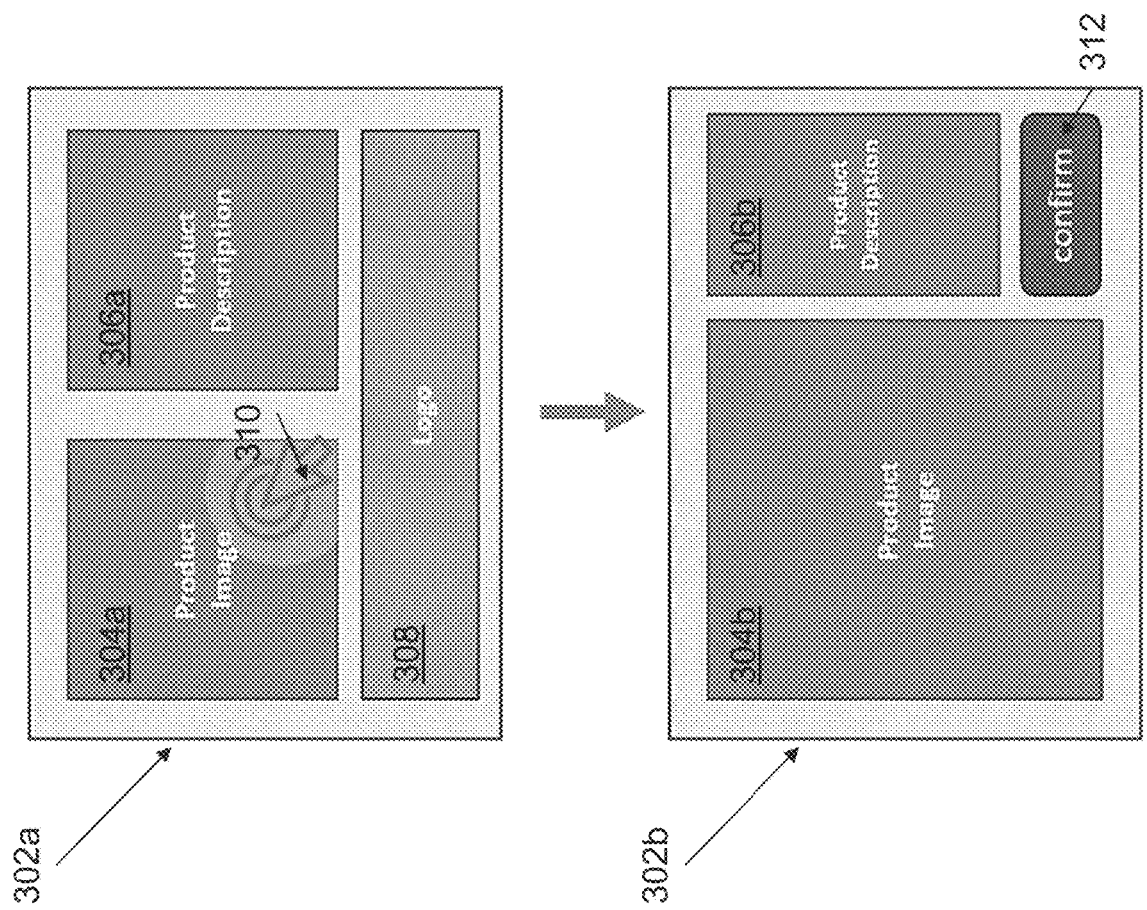
FIG. 3 is a diagram of a computerized graphical advertisement display that includes a call-to-action behavior upon determining that an initial user interaction was not intended.

FIG. 3 is a diagram of a computerized graphical advertisement display that includes a call-to-action behavior upon determining that an initial user interaction was not intended. As shown in FIG. 3, the computerized graphical advertisement display 302a includes a product image 304a (e.g., for an advertised product), a product description 306a corresponding to the product displayed in the product image 304a, and a logo 308 (e.g., of the advertiser, of the product's brand, etc.). Upon determining that a click 310 of the product image 304a was not intended, the computing device instructs the computerized graphical advertisement display (as shown in display 302b) to increase the size of the product image area 304b, reduce the size of the product description area 306b, remove the logo 308, and introduce a confirm button 312 to the lower portion of the display 302b. The change in activation behavior requires a user at user device 102, 107 to provide a click of the confirm button 312 in order to proceed to the advertiser's web site.

Figure 4:
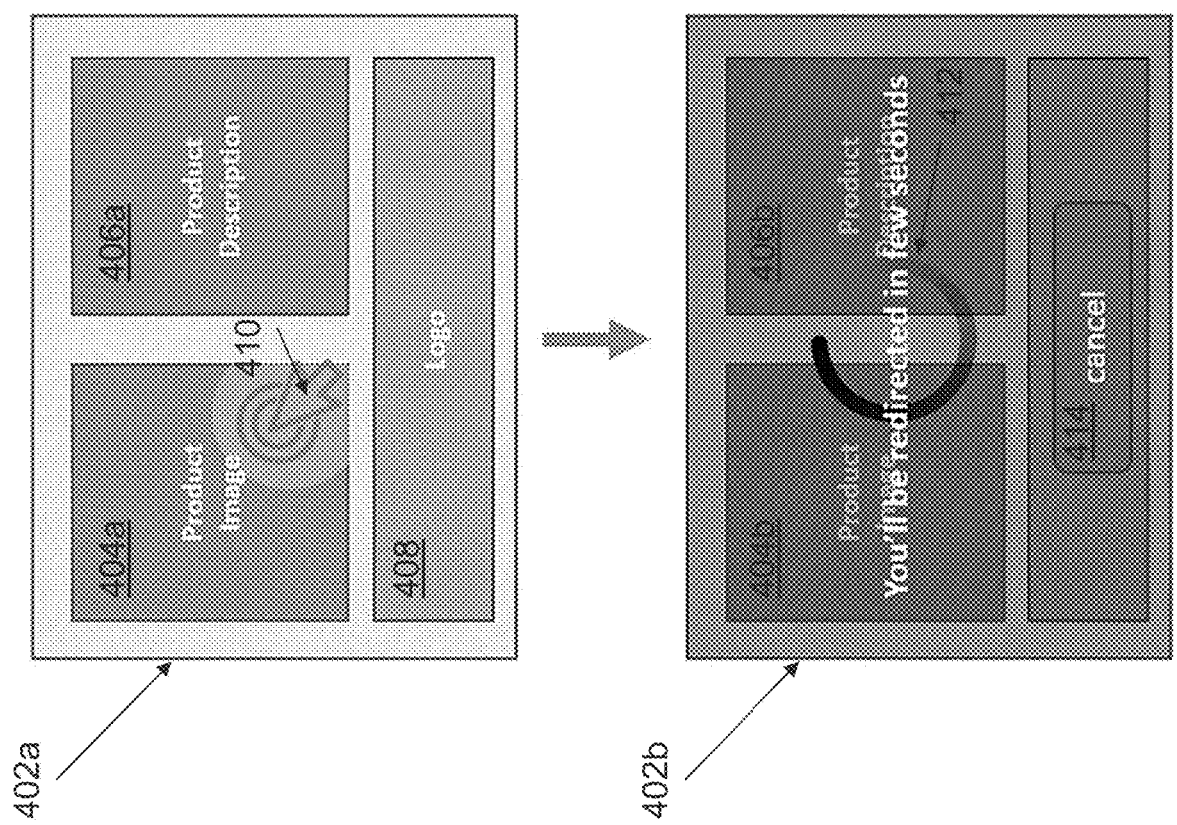
FIG. 4 is a diagram of a computerized graphical advertisement display that includes a countdown behavior upon determining that an initial user interaction was not intended.

FIG. 4 is a diagram of a computerized graphical advertisement display that includes a countdown behavior upon determining that an initial user interaction was not intended. As shown in FIG. 4, the computerized graphical advertisement display 402a includes a product image 404a (e.g., for an advertised product), a product description 406a corresponding to the product displayed in the product image 404a, and a logo 408 (e.g., of the advertiser, of the product's brand, etc.). Upon determining that a click 410 of the product image 404a was not intended, the computing device instructs the computerized graphical advertisement display (as shown in display 402b) to introduce a countdown overlay 412 on top of the display (in some cases, obscuring or covering the other elements 404b, 406b of the display), remove the logo 308, and introduce a cancel button 414 to the lower portion of the display 402b in place of the logo 308. The change in activation behavior results in a notification to the user at user device 102, 107 that redirection to the advertiser's website will occur within a predetermined time period (e.g., a matter of seconds) and also provides an option for the user to stop redirection by clicking the cancel button 414 within the countdown period.

Figure 5:
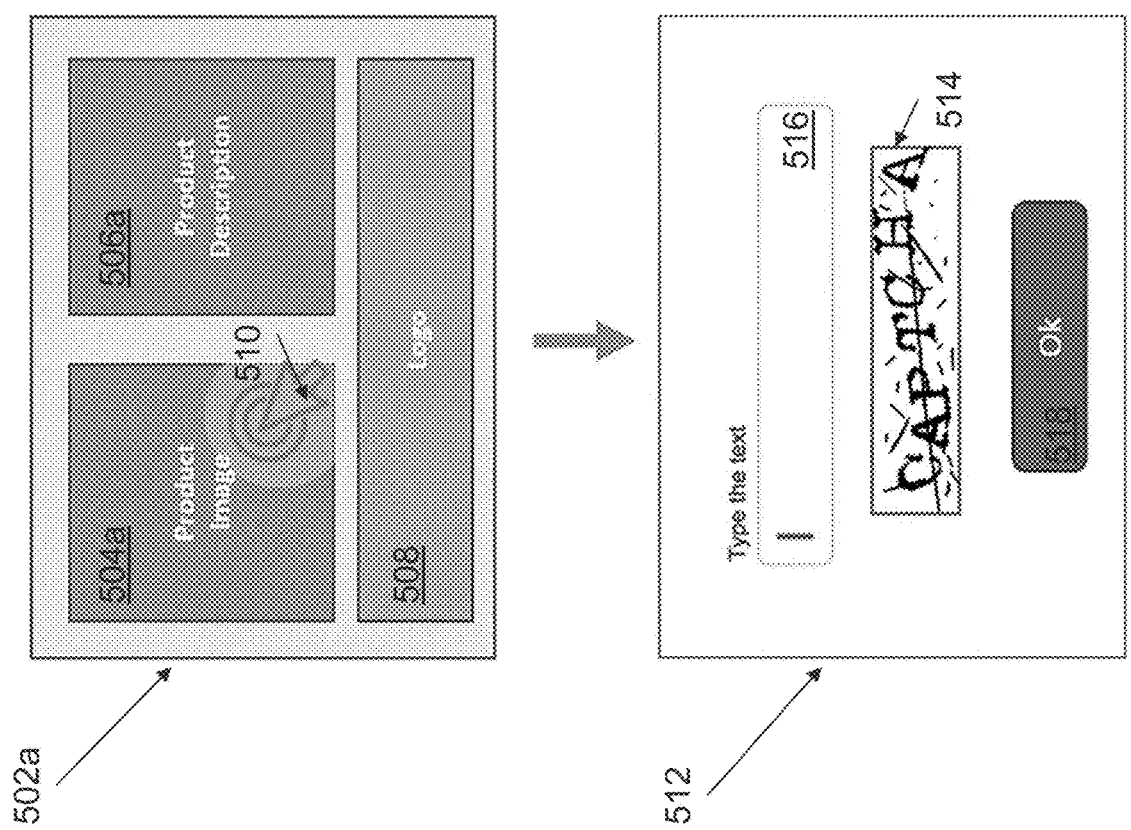
FIG. 5 is a diagram of a computerized graphical advertisement display that includes a CAPTCHA behavior upon determining that an initial user interaction was not intended.

FIG. 5 is a diagram of a computerized graphical advertisement display that includes a CAPTCHA behavior upon determining that an initial user interaction was not intended. As shown in FIG. 5, the computerized graphical advertisement display 502a includes a product image 504a (e.g., for an advertised product), a product description 506a corresponding to the product displayed in the product image 504a, and a logo 508 (e.g., of the advertiser, of the product's brand, etc.). Upon determining that a click 510 of the product image 504a was not intended, the computing device instructs the computerized graphical advertisement display (as shown in display 502b) to introduce a CAPTCHA user interface element 512 on top of the display (in some cases, obscuring or covering the other elements 504a, 506a, 508 of the display). The change in activation behavior results in the CAPTCHA request 512 being displayed to the user at user device 102, 107 so that the user must correctly complete the CAPTCHA request (e.g., by entering the text displayed in the CAPTCHA image 514 in the text box 516) and clicking the OK button 518 before redirection to the advertiser website will occur.

Figure 6:
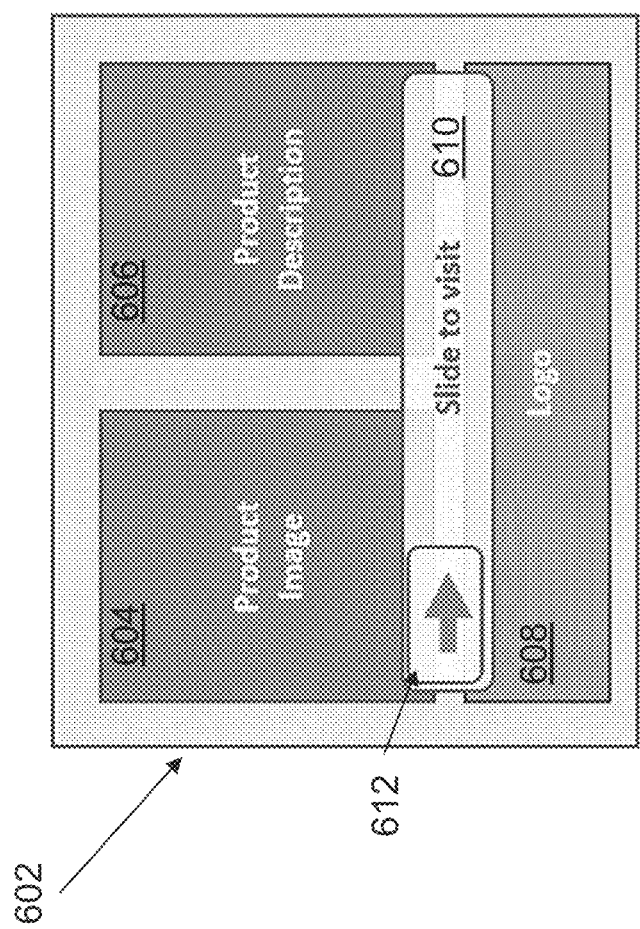
FIG. 6 is a diagram of a computerized graphical advertisement display that includes a slide to visit behavior upon determining that an initial user interaction was not intended.

FIG. 6 is a diagram of a computerized graphical advertisement display that includes a slide to visit behavior upon determining that an initial user interaction was not intended. As shown in FIG. 6, the computerized graphical advertisement display 602 includes a product image 604 (e.g., for an advertised product), a product description 606 corresponding to the product displayed in the product image 604, and a logo 608 (e.g., of the advertiser, of the product's brand, etc.). Upon determining that a tap of the product image 604 was not intended, the computing device instructs the computerized graphical advertisement display 602 to introduce a slide to visit user interface element 610 on top of the display. In some cases, the element 610 is opaque so that the element is displayed prominently on top of the display but does not completely obscure the other elements 604, 606, 608 of the display. The change in activation behavior results in the slide to visit user element 610 being displayed to the user at user device 102, 107 so that the user must slide or swipe the arrow 612 (e.g., from left to right across the display 602) before redirection to the advertiser website will occur.

Figure 7:
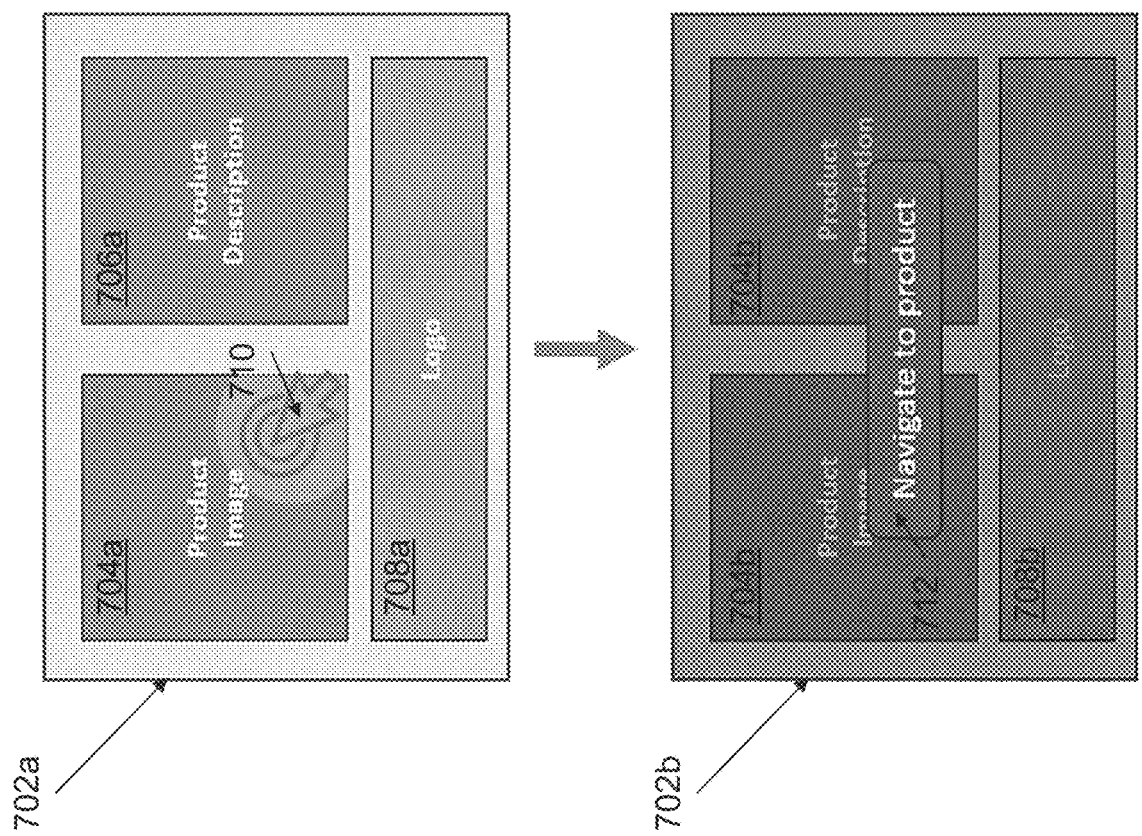
FIG. 7 is a diagram of a computerized graphical advertisement display that includes a confirmation overlay behavior upon determining that an initial user interaction was not intended.

FIG. 7 is a diagram of a computerized graphical advertisement display that includes a confirmation overlay behavior upon determining that an initial user interaction was not intended. As shown in FIG. 7, the computerized graphical advertisement display 702*a* includes a product image 704*a* (e.g., for an advertised product), a product description 706*a* corresponding to the product displayed in the product image 704*a*, and a logo 708*a* (e.g., of the advertiser, of the product's brand, etc.). Upon determining that a click 710 of the product image 304*a* was not intended, the computing device instructs the computerized graphical advertisement display (as shown in display 702*b*) to introduce a confirmation overlay on top of the display (in some cases, obscuring or covering the other elements 704*b*, 706*b*, 708*b* of the display). The change in activation behavior requires a user at user device 102, 107 to provide another click of the navigation button 712 in order to proceed to the advertiser's website.

Figure 8:
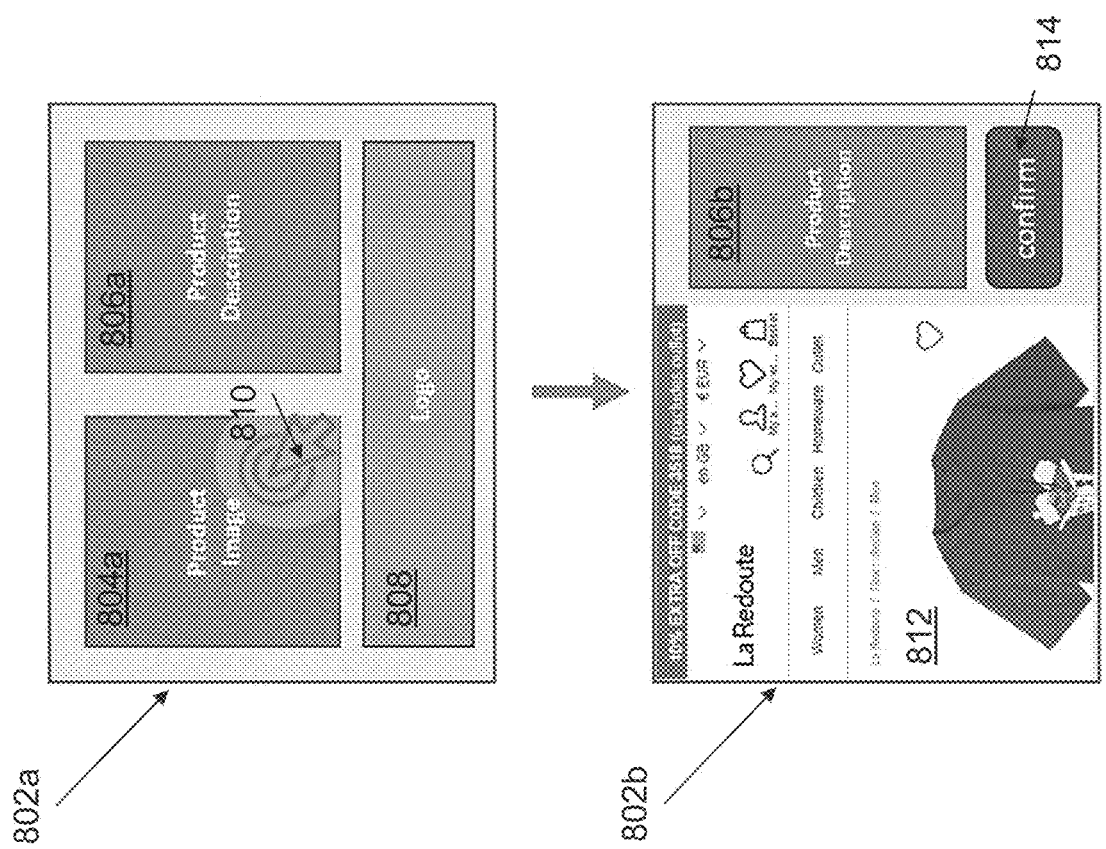
FIG. 8 is of a diagram a computerized graphical advertisement display that includes a website preview behavior upon determining that an initial user interaction was not intended.

FIG. 8 is of a diagram a computerized graphical advertisement display that includes a website preview behavior upon determining that an initial user interaction was not intended. As shown in FIG. 8, the computerized graphical advertisement display 802*a* includes a product image 804*a* (e.g., for an advertised product), a product description 806*a* corresponding to the product displayed in the product image 804*a*, and a logo 808 (e.g., of the advertiser, of the product's brand, etc.). Upon determining that a click 810 of the product image 804*a* was not intended, the computing device instructs the computerized graphical advertisement display (as shown in display 802*b*) to display a preview 812 of the advertiser's website (e.g., by removing the product image 804*a* and logo 808 and resizing the product description 806*b*). An image of the product can be displayed in whole or in part within the website preview 812. The computing device also introduces a confirm button 814 in the lower right corner of the display 802*b*. The change in activation behavior requires a user at user device 102, 107 to provide a click of the confirm button 814 in order to proceed to the advertiser's website.

The above-described techniques can be implemented in digital electronic circuitry, or in computer hardware, firmware, software, or in combinations of them. The implementation can be as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the technology by operating on input data and generating output. Method steps can also be performed by, and apparatus can be implemented as, special purpose logic circuitry, e.g., an FPGA (field programmable gate array) or an ASIC (application specific-integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer also includes, or be operatively coupled to receive data from or transfer data to, or both, one or more mass storage devices for storing data, e.g., magnetic, magneto-optical disks, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the above described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact through a communication network. The relationship of client and server arises by virtue of computer programs running on the respective computers and having a client-server relationship to each other.

The technology has been described in terms of particular embodiments. The alternatives described herein are examples for illustration only and not to limit the alternatives in any way. The steps of the technology can be performed in a different order and still achieve desirable results. Other embodiments are within the scope of the following claims.

What is claimed is:

1. A system for dynamically modifying an activation behavior of a computerized graphical advertisement display, the system comprising:
   a server computing device with a memory for storing computer-executable instructions and a processor that executes the computer-executable instructions to:
      receive a request for graphical display source code for a computerized graphical advertisement display; and
      generate the graphical display source code for the computerized graphical advertisement display, the graphical display source code comprising a plurality of activation behaviors for the computerized graphical advertisement display, wherein upon generation the computerized graphical advertisement display is associated with a default activation behavior of the plurality of activation behaviors;
   a client computing device with a memory for storing computer-executable instructions and a processor that executes the computer-executable instructions to:
      display the computerized graphical advertisement display using the graphical display source code received from the server computing device;
      capture a user interaction event for the computerized graphical advertisement display, the user interaction event associated with a user;
      determine whether the user intended to activate the computerized graphical advertisement display via the captured user interaction event, based upon one or more characteristics of the user interaction event, one or more characteristics of the computerized graphical advertisement display, one or more characteristics of the client computing device, and an interaction history;
      select one of the plurality of activation behaviors in the graphical display source code based upon the determination; and
      change the default activation behavior for the computerized graphical advertisement display to the selected activation behavior and execute the selected activation behavior of the computerized graphical advertisement display.

2. The system of claim 1, wherein the client computing device executes the selected activation behavior of the computerized graphical advertisement display upon detecting a user interaction event that matches a selected activation behavior for the computerized graphical advertisement display.

3. The system of claim 1, wherein the plurality of activation behaviors for the computerized graphical advertisement display comprise redirection to a landing page, display of a countdown window, display of a call-to-action window, display of a confirmation window, display of a CAPTCHA request, display of a swipe request, and display of a landing page preview.

4. The system of claim 1, wherein the user interaction event comprises one or more of: a single click, a double click, a sequence of single clicks, a cursor movement, a scroll event, a single tap, a double tap, a touch, a multitouch, a sequence of taps, one or more coordinates of a single click, one or more coordinates of a double click, one or more coordinates of a single tap, one or more coordinates of a double tap, a force associated with a single tap, a force associated with a double tap, or a swipe.

5. The system of claim 1, wherein the client computing device discards the user interaction event based upon the determination.

6. The system of claim 1 wherein the determination comprises a probability that the user intended to activate the computerized graphical advertisement display via the captured user interaction event, a heuristic associated with the user's intent to activate the computerized graphical advertisement display via the captured user interaction event, or a combination of the probability and the heuristic.

7. The system of claim 1, wherein the one or more characteristics of the user interaction event comprise a duration of the user interaction event, a length of time between display of the computerized graphical advertisement display and detection of the user interaction event, a location of a cursor in the computerized graphical advertisement display that is associated with the user interaction event, a distance between a location of a cursor in the computerized graphical advertisement display at a start of the user interaction event and at an end of the user interaction event, a number of sub-events within the user interaction event, a sequence of sub-events within the user interaction event, a force applied by the user to the computing device during the user interaction event, a state of the computerized graphical advertisement display at a time of detection of the user interaction event, and one or more characteristics of the computing device at a time of detection of the user interaction event.

8. The system of claim 7, wherein the one or more characteristics of a visual element of the computerized graphical advertisement display associated with a user interaction comprise a size of the visual element, a position of the visual element, an opacity of the visual element, a color of the visual element, a movement speed of the visual element, and a contrast of the visual element with a surrounding area of the computerized graphical advertisement display.

9. The system of claim 7, wherein display of the computerized graphical advertisement display comprises a point of time at which the computerized graphical advertisement display is generated by the server computing device, a point of time at which the computerized graphical advertisement display is viewable on the client computing device, or a point of time at which the graphical display source code of the computerized graphical advertisement display is executed by the client computing device.

10. The system of claim 1, wherein the interaction history comprises one or more of user interaction events of the user with one or more other computerized graphical advertisement displays, one or more of user interaction events of other users with one or more other computerized graphical advertisement displays, and one or more advertisement characteristics of one or more other computerized graphical advertisement displays.

11. The system of claim 1, wherein the one or more characteristics of the computerized graphical advertisement display comprise a size of the computerized graphical advertisement display, a display location of the computerized graphical advertisement display, a software application associated with display of the computerized graphical advertisement display, a framerate of a software application associated with display of the computerized graphical advertisement display, a supply side platform (SSP) associated with the computerized graphical advertisement display, a software development kit (SDK) associated with the computerized graphical advertisement display, and one or more characteristics of a visual element of the computerized graphical advertisement display associated with a user interaction.

12. The system of claim 1, wherein the one or more characteristics of the client computing device comprise an operating system of the client computing device, a CPU speed of the client computing device, a touch support capability of the client computing device, attributes of an accelerometer embedded in the client computing device, an ambient lighting reading captured by the client computing device, a screen resolution of the client computing device, a resolution of touch events of the client computing device, a resolution of swipe events of the client computing device, and a hardware platform of the client computing device.

13. The system of claim 1, wherein the client computing device displays the computerized graphical advertisement display in a webpage using a browser installed on the client computing device.

14. The system of claim 13, wherein the client computing device redirects the browser to another webpage upon executing the selected activation behavior of the computerized graphical advertisement display, wherein the selected activation behavior comprises: display of a countdown window, display of a call-to-action window, display of a confirmation window, display of a CAPTCHA request, display of a swipe request, or display of a landing page preview.

15. The system of claim 1, wherein the client computing device displays the computerized graphical advertisement display in a native application installed on the client computing device.

16. The system of claim 15, wherein the client computing device activates functionality of the native application upon executing the selected activation behavior of the computerized graphical advertisement display, wherein the selected activation behavior comprises: display of a countdown window, display of a call-to-action window, display of a confirmation window, display of a CAPTCHA request, display of a swipe request, or display of a landing page preview.

17. The system of claim 16, wherein the activated functionality of the native application comprises launching a browser installed on the client computing device and redirecting the launched browser to a webpage, or launching another native application on the client computing device.

18. The system of claim 1, wherein determining whether the user intended to activate the computerized graphical advertisement display via the captured user interaction event comprises determining, by the server computing device, a value associated with the user interaction event and adjusting, by the client computing device, the determination based upon the determined value.

19. The system of claim 18, wherein the client computing device uses one or more heuristic functions to adjust the determination based upon the determined value.

20. The system of claim 18, wherein the value associated with the user interaction event comprises a publisher cost associated with the computerized graphical advertisement display, an advertiser cost associated with the computerized graphical advertisement display, and a product value associated with the computerized graphical advertisement display.

21. The system of claim 18, wherein the client computing device adapts one or more characteristics of the computerized graphical advertisement display based upon the adjusted determination.

22. The system of claim 21, wherein the adapted one or more characteristics of the computerized graphical advertisement display comprise a size of the computerized graphical advertisement display, a location of the computerized graphical advertisement display, a size of a visual element of the computerized graphical advertisement display, a location of a visual element of the computerized graphical advertisement display, a change to an animation of the computerized graphical advertisement display, and a presence of a visual element of the computerized graphical advertisement display.

23. The system of claim 1, wherein the determining step is performed by the server computing device.

24. A computerized method of dynamically modifying an activation behavior of a computerized graphical advertisement display, the method comprising:
  receiving, by a server computing device from a client computing device, a request for graphical display source code for a computerized graphical advertisement display; and
  generating, by the server computing device, the graphical display source code for the computerized graphical advertisement display, the graphical display source code comprising a plurality of activation behaviors for the computerized graphical advertisement display, wherein upon generation the computerized graphical advertisement display is associated with a default activation behavior of the plurality of activation behaviors;
  displaying, by the client computing device, the computerized graphical advertisement display using the graphical display source code received from the server computing device;
  capturing, by the client computing device, a user interaction event for the computerized graphical advertisement display, the user interaction event associated with a user;
  determining, by the client computing device, whether the user intended to activate the computerized graphical advertisement display via the captured user interaction event, based upon one or more characteristics of the user interaction event, one or more characteristics of the computerized graphical advertisement display, one or more characteristics of the client computing device, and an interaction history;
  selecting, by the client computing device, one of the plurality of activation behaviors in the graphical display source code based upon the determination; and
  changing, by the client computing device, the default activation behavior for the computerized graphical advertisement display to the selected activation behavior and execute the selected activation behavior of the computerized graphical advertisement display.

25. The method of claim 24, wherein the client computing device executes the selected activation behavior of the computerized graphical advertisement display upon detecting a user interaction event that matches a selected activation behavior for the computerized graphical advertisement display.

26. The method of claim 24, wherein the plurality of activation behaviors for the computerized graphical advertisement display comprise redirection to a landing page, display of a countdown window, display of a call-to-action window, display of a confirmation window, display of a CAPTCHA request, display of a swipe request, and display of a landing page preview.

27. The method of claim 24, wherein the user interaction event comprises one or more of: a single click, a double click, a sequence of single clicks, a cursor movement, a scroll event, a single tap, a double tap, a touch, a multitouch, a sequence of taps, one or more coordinates of a single click, one or more coordinates of a double click, one or more coordinates of a single tap, one or more coordinates of a double tap, a force associated with a single tap, a force associated with a double tap, or a swipe.

28. The method of claim 24, wherein the client computing device discards the user interaction event based upon the determination.

29. The method of claim 24, wherein the determination comprises a probability that the user intended to activate the computerized graphical advertisement display via the captured user interaction event, a heuristic associated with the user's intent to activate the computerized graphical advertisement display via the captured user interaction event, or a combination of the probability and the heuristic.

30. The method of claim 24, wherein the one or more characteristics of the user interaction event comprise a duration of the user interaction event, a length of time between display of the computerized graphical advertisement display and detection of the user interaction event, a location of a cursor in the computerized graphical advertisement display that is associated with the user interaction event, a distance between a location of a cursor in the computerized graphical advertisement display at a start of the user interaction event and at an end of the user interaction event, a number of sub-events within the user interaction event, a sequence of sub-events within the user interaction event, a force applied by the user to the computing device during the user interaction event, a state of the computerized graphical advertisement display at a time of detection of the user interaction event, and one or more characteristics of the computing device at a time of detection of the user interaction event.

31. The method of claim 30, wherein the one or more characteristics of a visual element of the computerized graphical advertisement display associated with a user interaction comprise a size of the visual element, a position of the visual element, an opacity of the visual element, a color of the visual element, a movement speed of the visual element, and a contrast of the visual element with a surrounding area of the computerized graphical advertisement display.

32. The method of claim 30, wherein display of the computerized graphical advertisement display comprises a point of time at which the computerized graphical advertisement display is generated by the server computing device, a point of time at which the computerized graphical advertisement display is viewable on the client computing device, or a point of time at which the graphical display source code of the computerized graphical advertisement display is executed by the client computing device.

33. The method of claim 24, wherein the interaction history comprises one or more of user interaction events of the user with one or more other computerized graphical advertisement displays, one or more of user interaction events of other users with one or more other computerized graphical advertisement displays, and one or more advertisement characteristics of one or more other computerized graphical advertisement displays.

34. The method of claim 24, wherein the one or more characteristics of the computerized graphical advertisement display comprise a size of the computerized graphical advertisement display, a display location of the computerized graphical advertisement display, a software application associated with display of the computerized graphical advertisement display, a framerate of a software application associated with display of the computerized graphical advertisement display, a supply side platform (SSP) associated with the computerized graphical advertisement display, a software development kit (SDK) associated with the computerized graphical advertisement display, and one or more characteristics of a visual element of the computerized graphical advertisement display associated with a user interaction.

35. The method of claim 24, wherein the one or more characteristics of the client computing device comprise an operating system of the client computing device, a CPU speed of the client computing device, a touch support capability of the client computing device, attributes of an accelerometer embedded in the client computing device, an ambient lighting reading captured by the client computing device, a screen resolution of the client computing device, a resolution of touch events of the client computing device, a resolution of swipe events of the client computing device, and a hardware platform of the client computing device.

36. The method of claim 24, wherein the client computing device displays the computerized graphical advertisement display in a webpage using a browser installed on the client computing device.

37. The method of claim 36, wherein the client computing device redirects the browser to another webpage upon executing the selected activation behavior of the computerized graphical advertisement display, wherein the selected activation behavior comprises: display of a countdown window, display of a call-to-action window, display of a confirmation window, display of a CAPTCHA request, display of a swipe request, or display of a landing page preview.

38. The method of claim 24, wherein the client computing device displays the computerized graphical advertisement display in a native application installed on the client computing device.

39. The method of claim 38, wherein the client computing device activates functionality of the native application upon executing the selected activation behavior of the computerized graphical advertisement display, wherein the selected activation behavior comprises: display of a countdown window, display of a call-to-action window, display of a confirmation window, display of a CAPTCHA request, display of a swipe request, or display of a landing page preview.

40. The method of claim 39, wherein the activated functionality of the native application comprises launching a browser installed on the client computing device and redirecting the launched browser to a webpage, or launching another native application on the client computing device.

41. The method of claim 24, wherein determining whether the user intended to activate the computerized graphical advertisement display via the captured user interaction event comprises determining, by the server computing device, a value associated with the user interaction event and adjusting, by the client computing device, the determination based upon the determined value.

42. The method of claim 41, wherein the client computing device uses one or more heuristic functions to adjust the determination based upon the determined value.

43. The method of claim 41, wherein the value associated with the user interaction event comprises a publisher cost associated with the computerized graphical advertisement display, an advertiser cost associated with the computerized graphical advertisement display, and a product value associated with the computerized graphical advertisement display.

44. The method of claim 41, wherein the client computing device adapts one or more characteristics of the computerized graphical advertisement display based upon the adjusted determination.

45. The method of claim 44, wherein the adapted one or more characteristics of the computerized graphical advertisement display comprise a size of the computerized graphical advertisement display, a location of the computerized graphical advertisement display, a size of a visual element of the computerized graphical advertisement display, a location of a visual element of the computerized graphical advertisement display, a change to an animation of the computerized graphical advertisement display, and a presence of a visual element of the computerized graphical advertisement display.

46. The method of claim 24, wherein the determining step is performed by the server computing device.

* * * * *